UNITED STATES PATENT OFFICE.

WILLIAM P. KOOKOGEY, OF BROOKLYN, NEW YORK.

BATTERY SOLUTION.

SPECIFICATION forming part of Letters Patent No. 364,656, dated June 14, 1887.

Application filed June 12, 1886. Serial No. 204,981. (No specimens.)

*To all whom it may concern:*

Be it known that I, WILLIAM P. KOOKOGEY, of Brooklyn, in the county of Kings and State of New York, have invented certain new and useful Improvements in Battery Solutions, of which the following is a specification.

My invention consists in a novel method or mode of preparing bichromate-of-potash solution for electrical batteries, as hereinafter set forth.

In a previous application, Serial No. 185,049, filed December 8, 1886, I have described a method of preparing the same solution, in which the bichromate of potash was added to water in measured quantity, sufficient to produce a saturated solution without deposit of bichromate, after which, with the water at a stated temperature, sulphuric acid was added in prescribed quantity. By such method or procedure I am enabled to produce a very perfect solution; but in order to attain uniform and satisfactory results it was found necessary to proceed with the utmost care and to observe the greatest accuracy of measurement or proportion, otherwise the resulting solution would not be a saturated solution, or else there would be a waste of material. I have therefore adopted and now follow the plan hereinafter set forth, which, though practically tested by me prior to filing my aforesaid application, was not at that time regularly or exclusively adopted, because I was then unable to utilize a certain deposit or residuum incident to the preparation of the solution, and therefore found the plan too expensive for commercial purposes. I have now discovered a mode of utilizing the residuum, and by carrying out the complete process or method and utilizing the hitherto waste deposit I am enabled to render the method commercially successful.

Bichromate of potash is not a true twofold salt, but contains one atom of chromic anhydride and one atom of chromate of potash. By dissolving the salt to solution in hot water and allowing it to cool and settle, the precipitate is chromate of potash, and the solution will contain chromic anhydride and bichromate of potash. While the dissolving does not entirely separate the salt into its elements, still the anhydride being the more soluble it is that that is chiefly held in solution, one of the proofs of which is that chromate of potash is not soluble in a soluble solution of chromic anhydride. It is on the above composition of bichromate of potash—to wit, one atom of chromic anhydride and one of chromate of potassium—that this application depends.

My plan is as follows, it being understood that where weights are given the avoirdupois table or scale is meant: To two and one-half pounds of hot water add one pound of bichromate of potassium, and allow the preparation to cool. When cool, draw off the liquid, which will be a saturated solution of bichromate of potassium, a deposit of potassium chromate being left behind at the bottom of the vessel. To the saturated solution I add three and one-half pounds of sulphuric acid, ($H_2SO_4$,) of about the specific gravity of 1.835° to 1.840°, (66° Baumé.) The mixture or solution is again allowed to cool and is permitted to stand from twelve to twenty-four hours at a temperature of about 70° Fahrenheit, in order that the potassium sulphate may crystallize out. After this I again siphon off the liquid, which is then ready for use in a battery. To utilize the first deposit or residuum, (chromate,) it is dissolved in water and to the solution is added a sufficient quantity of potassium carbonate to change the color of the liquid from red to yellow. The water is then evaporated and the residuum is a good quality of commercial neutral or yellow chromate of potassium, the value of which, deducted from the cost of making the battery solution and the cost of the labor and materials involved in converting the chromate into neutral or yellow chromate, leaves the actual cost of the battery solution very small.

By the foregoing plan, in which a quantity of bichromate of potassium is used greater than can possibly be taken up by the water, I do away with the necessity for any careful or accurate measurement, yet insure the production of a perfectly-saturated solution without ultimate waste or loss of material. This plan can be carried out with ease and certainty by any ordinary workman, whereas the former plan requires greater skill and care than are commonly met with in the class of assistants upon whom manufacturers of such preparations are necessarily dependent.

Having thus described my invention, what I claim is—

1. The herein-described method or mode of preparing a saturated solution of bichromate of potassium, which consists in adding to a given quantity of hot water bichromate of potassium in a quantity greater than can be taken up by such quantity of water, permitting the bichromate to dissolve and the solution to cool, then drawing off the liquid from the chromate settled at the bottom of the vessel, next adding sulphuric acid and permitting the solution to settle, and finally separating the liquid from the deposit at the bottom of the vessel.

2. The herein-described method of preparing a saturated solution of bichromate of potassium and utilizing the residuum incident to its production, which consists in adding to a given quantity of hot water bichromate of potassium in quantity greater than can be taken up by the water, permitting the solution to cool, then separating the liquid from the precipitate in the vessel, next adding sulphuric acid, permitting the solution to rest a suitable length of time, then separating the liquid from any matter that may be precipitated during the period of rest, and finally dissolving the chromate first deposited and adding thereto carbonate of potassium in quantity sufficient to change the color to yellow, thus producing yellow or neutral chromate.

WM. P. KOOKOGEY.

Witnesses:
WILLIAM W. DODGE,
WALTER S. DODGE.